(No Model.) 2 Sheets—Sheet 1.

W. KUNZ.
CAR STEP.

No. 493,932. Patented Mar. 21, 1893.

Witnesses:
Chas. Knechtel
F. P. Kersten

Inventor
William Kunz
By Otto E. Hoddick
Attorney

UNITED STATES PATENT OFFICE.

WILLIAM KUNZ, OF BUFFALO, NEW YORK.

CAR-STEP.

SPECIFICATION forming part of Letters Patent No. 493,932, dated March 21, 1893.

Application filed December 5, 1892. Serial No. 454,188. (No model.)

*To all whom it may concern:*

Be it known that I, WILLIAM KUNZ, of Buffalo, in the county of Erie and State of New York, have invented certain new and useful Improvements in Car-Steps; and I do hereby declare that the following description of my said invention, taken in connection with the accompanying sheet of drawings, forms a full, clear, and exact specification, which will enable others skilled in the art to which it appertains to make and use the same.

My invention relates to improvements in car or vehicle steps and more particularly to that class of car steps in which a movable step is attached to the lowest permanent step in such a manner as to enable it to be raised and lowered when desired. Its object is to provide the steps of a car with a movable lower step, the operating mechanism of which is connected to automatic gates which inclose the platform and steps of a car as the movable step is raised.

It consists in the novel and peculiar combination of parts and details of construction as hereinafter first fully set forth and described, and then pointed out in the claims.

Figure 1:
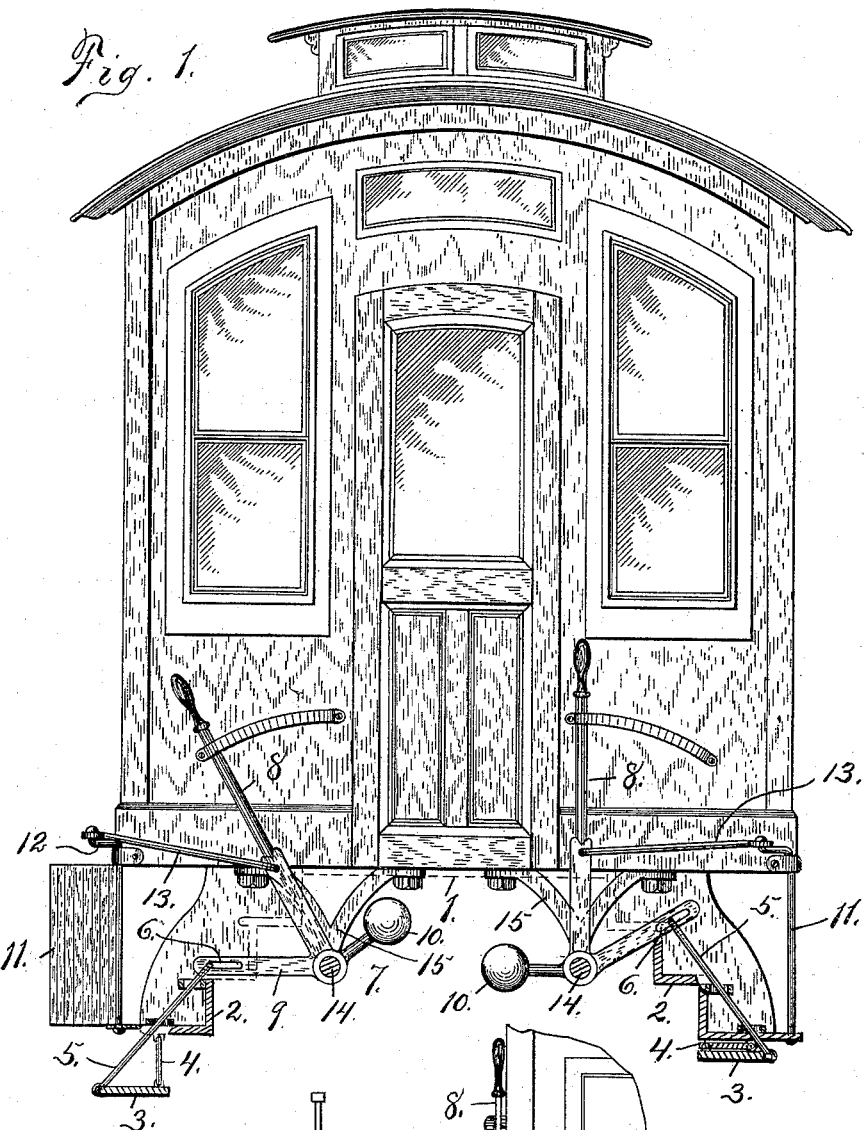
Figure 2:
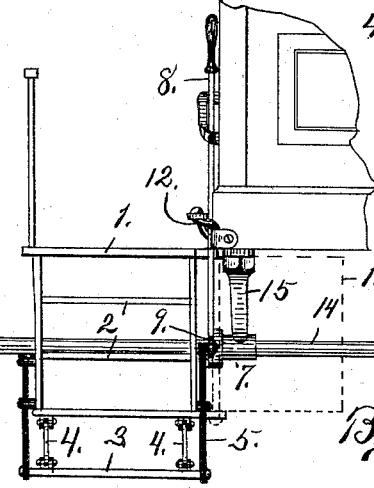
Figure 3:
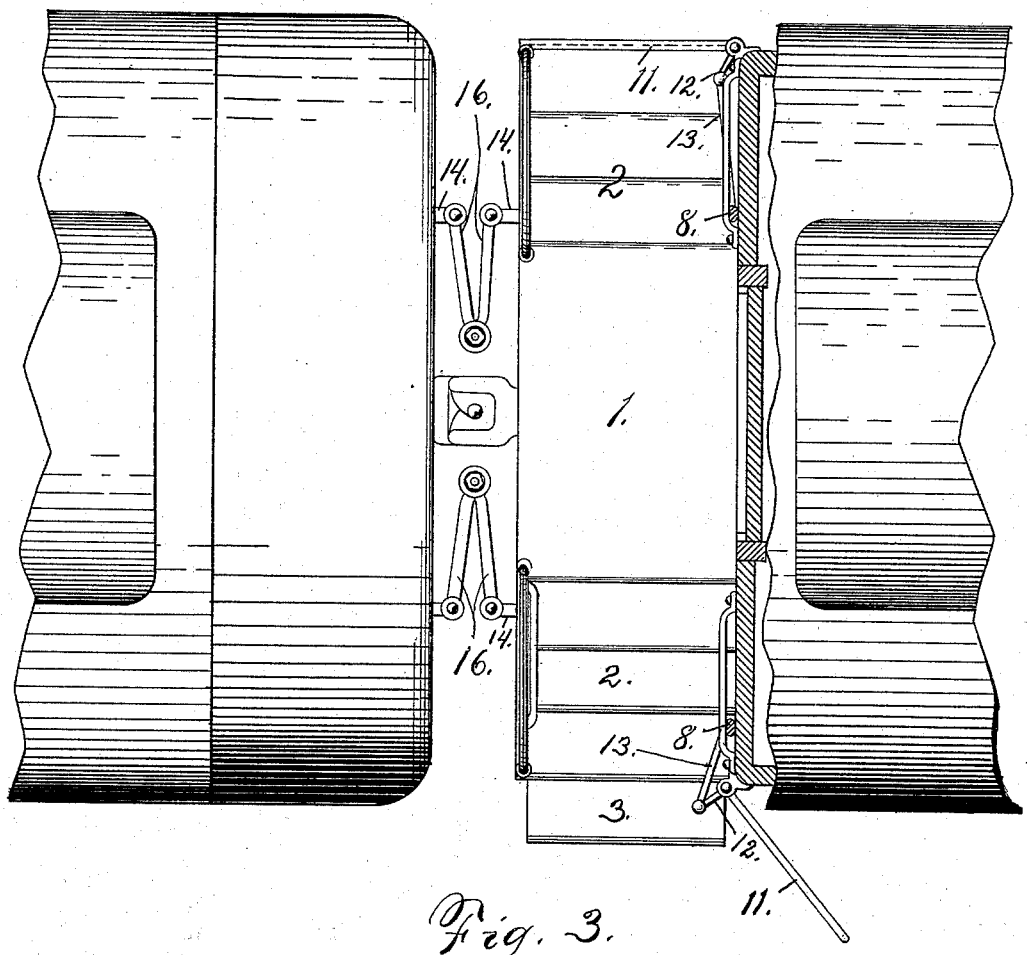

In the drawings already referred to which serve to illustrate my said invention more fully, Figure 1, is a rear view of a car equipped with my improvement with portions broken away to show construction. Fig. 2, is a side view of the same, and Fig. 3, is a top plan view.

Referring to the drawings, 1, is the stationary platform which is of ordinary construction and provided with the stationary steps 2. To the lower one of these steps 2, I have arranged the movable steps 3. These steps 3, are suspended from the steps 2, by the short pivoted rods 4, and held in a horizontal line by the connecting rod 5, which rod is pivoted at its upper end in an elongated slot 6, arranged in the bell crank lever 7. This bell crank lever 7, consists of the arms 8, and 9, and weighted arm 10. To the corners of the car are pivoted the gates 11, at the upper ends of which a crank arm 12, is arranged which is connected to the arm 8, by the connecting rod 13.

14. 14. are two horizontal shafts running parallel with the car and suspended in the brackets 15. Upon these shafts 14, the bell crank levers 7, are rigidly mounted. To the ends of these shafts 14, are secured the coupling levers 16, (see Fig. 3.) By means of these levers I am enabled to operate the bell crank levers on one side of an entire train of cars.

In operating a train equipped with my improvement, the train man or manipulator has but to throw out the lever 8, as seen at the left hand side of Fig. 1, and the gates 11, will be thrown open by reason of the connecting arm 13, pivoted to the arm 8, and crank arm 12, and the step 3, will be carried down with the rod 5, and when it is desired to raise the step 3, and inclose the platform, the lever arm 8, is returned to its vertical position as seen at the right hand side of Fig. 1. The coupling levers 16, are so arranged as to enable the shafts 14, on adjoining cars to be carried to and from each other and still be rigidly connected when it is desired to revolve them by one of the lever arms 8.

Having thus described my invention, what I claim, and desire to secure by Letters Patent, is—

1. In combination with the platform and fixed steps of a car, the movable steps 3, suspended by the rods 4. and operated by the bell-crank-lever 7. and connecting rod 5, the whole arranged and operating substantially as shown and described.

2. In combination with the platform and fixed steps of a car, the movable steps 3, suspended by the rods 4, and operated by the bell crank lever 7, and connecting rod 5, and the pivoted gates 11, operated by the said bell crank lever 7, to which it is connected by the rod 13, the whole arranged and operating, substantially as shown and described.

3. The herein described movable car-step and gate consisting essentially of the pivoted gates 11, and movable steps 3, operated by the bell crank levers 7, said levers being rigidly mounted on the shaft 14, and coupling levers 16, for adjustably securing the shafts 14, to similar shafts, arranged on an adjoining car, substantially as and for the purpose stated.

In testimony that I claim the foregoing as my invention I have hereto set my hand in the presence of two subscribing witnesses.

WILLIAM KUNZ.

Attest:
OTTO E. HODDICK,
WILLIAM L. MARCY.